(12) United States Patent
Downing

(10) Patent No.: US 7,356,142 B1
(45) Date of Patent: Apr. 8, 2008

(54) SECURE COMPACT DISK AND PLAYER

(75) Inventor: Daniel D. Downing, Montara, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/568,624

(22) Filed: May 10, 2000

(51) Int. Cl.
*H04L 9/10* (2006.01)
*H04L 9/00* (2006.01)

(52) U.S. Cl. .................. 380/201; 380/210; 380/252; 380/287; 369/47.1; 369/47.12; 369/47.13; 369/47.19; 369/47.3; 369/124.01; 369/124.08; 369/272.1; 369/275.3; 713/194

(58) Field of Classification Search ............... 713/201
See application file for complete search history.

(56) References Cited

U.S. PATENT DOCUMENTS

| 5,499,224 | A | * | 3/1996 | Sanada ................... 369/47.2 |
| 5,661,848 | A | * | 8/1997 | Bonke et al. ............. 711/112 |
| 5,720,030 | A | * | 2/1998 | Kamihara et al. ........ 714/42 |
| 5,768,286 | A | * | 6/1998 | Hsu et al. ................ 714/719 |
| 5,848,037 | A | * | 12/1998 | Iwasaki et al. ......... 369/47.22 |
| 6,128,257 | A | * | 10/2000 | Zhou et al. ............. 369/30.37 |
| 6,185,248 | B1 | * | 2/2001 | Wiegand ................. 375/222 |
| 6,233,715 | B1 | * | 5/2001 | Kuki et al. .............. 714/795 |
| 6,487,293 | B2 | * | 11/2002 | Sako et al. .............. 380/201 |
| 6,580,682 | B1 | * | 6/2003 | Kamperman et al. ... 369/275.3 |

FOREIGN PATENT DOCUMENTS

| EP | 0 418 964 | 3/1991 |
| EP | 0 783 167 | 7/1997 |
| EP | 0 794 496 | 9/1997 |
| JP | 08 153331 | 6/1996 |

(Continued)

OTHER PUBLICATIONS

ECMA Standardizing Information and Communication Systems: "Standard ECMA—130: Data interchange on read-only 120 mm optical data disks (CD-ROM)" Standard ECMA—130, XP002143627 Geneva, Switzerland.
ECMA Standardizing Information and Communication Systems (1999). "Standard ECMA—272: 120 mm Rewritable Disk (DVD-RAM)," Standard ECMA, xx, xx No. 272. Second Edition, pp. 1-115. XP002186767.

*Primary Examiner*—Syed A. Zia
(74) *Attorney, Agent, or Firm*—Morrison & Foerster LLP

(57) ABSTRACT

A method for recording data on an optical medium is disclosed. In one embodiment, the method includes receiving a first plurality of frames of data at a Cross Interleave Reed-Solomon Code (CIRC) encoder, encoding the first plurality of frames of data by the CIRC encoder to generate a second plurality of frames of data, generating a set of data to form a Q sub-channel, altering selected data bits in the Q sub-channel to form an encoded Q sub-channel, forming a plurality of control bytes including the encoded Q sub-channel, adding one of the control bytes to each one of the second plurality of frames of data to generate a third plurality of frames of data, encoding selected portions of the third plurality of frames of data by an EFM encoder to generate a plurality of channel frames, and recording the channel frames on the optical medium. This method allows CDs to be recorded that cannot be played by conventional CD players. A corresponding optical disk playback system and method for receiving, decoding and presenting data are also disclosed.

35 Claims, 3 Drawing Sheets

FOREIGN PATENT DOCUMENTS

| WO | WO 98/03973 | 1/1998 |
| WO | WO 98/52114 | 11/1998 |
| WO | WO 98/52194 | 11/1998 |
| WO | WO 00/68945 | 11/2000 |

* cited by examiner

SECURE COMPACT DISK AND PLAYER

CROSS REFERENCE TO RELATED APPLICATION

This application is related to co-pending Provisional Patent Application Ser. No. 60/133,456, entitled "CD Player with Secure Sector Address Information," which is incorporated herein by reference in its entirety.

TECHNICAL FIELD OF THE INVENTION

This invention relates to compact disks and compact disk players, specifically to a secure system involving proprietary compact disk formats and associated compliant players to prevent copying and unauthorized use of compact disk program material.

BACKGROUND OF THE INVENTION

Compact disks (CDs) are well known; there is a variety of types of compact disks. For instance, CDROMs typically hold computer programs and data. There are also audio compact disks which hold music, etc. and video compact disks for material such as movies. Each type of compact disk has an associated player. There are a variety of compact disk standards.

Compact disks are a digital storage media, unlike conventional videotape. Therefore copies of such digital material contain all of the information of the original and are a frequent target for pirates (copyright infringers) who make unauthorized copies or otherwise misuse same. There have been developed a number of security systems to prevent unauthorized copying in the compact disk field.

The present invention is directed to a particular aspect of the security problem of compact disks including video CDs and CDROMs (data CDs). Specifically, there is a need for a compact disk player that only plays proprietary CDs, does not play standard CDs, where the proprietary CDs cannot be copied and the proprietary CDs do not play on standard CD players. Thus this is a "closed" system involving proprietary (in terms of the format) CDs and associated players. A typical application is for a toy system where there is no need to play generally available CDs but only the toy system's CDs are of interest.

Any such system must be relatively inexpensive to implement (since these are consumer players), and must be robust so as to prevent copying, and not interfere with playing and enjoyment of the CD program material. The cost requirement is especially restrictive since even a few dollars of added cost are problematic in consumer electronics. Therefore, well-known methods such as encryption may be problematic since they may require inclusion in the player of a dedicated decryption integrated circuit. Since the decryption must be performed in real time, software decryption is generally less useful in this context.

SUMMARY OF THE INVENTION

In an otherwise conventional compact disk player and compact disk, an improvement accomplishes the above goals. This improvement has the above effects of, for the proprietary ("compliant") compact disk player, allowing it only to play compliant CDs; the compliant player will not play standard CDs; the proprietary CDs cannot be copied (that is, if copied they cannot be successfully played on either a compliant player or a standard player); and the compliant CDs do not play on a standard CD player. Thus this creates an entirely closed system in terms of the compliant CDs and associated compliant players. Anyone wishing to play a compliant CD must have a compliant player, the use of which is limited to playing compliant CDs. Of course such a system is targeted to particular markets and requires availability of both the compliant players and the compliant CDs.

In accordance with one aspect of the present invention, a method for recording data on an optical medium is disclosed. In one embodiment, the method includes receiving a first plurality of frames of data at a Cross Interleave Reed-Solomon Code (CIRC) encoder, encoding the first plurality of frames of data by the CIRC encoder to generate a second plurality of frames of data, generating a set of data to form a Q sub-channel, altering selected data bits in the Q sub-channel to form an encoded Q sub-channel, forming a plurality of control bytes including the encoded Q sub-channel, adding one of the control bytes to each one of the second plurality of frames of data to generate a third plurality of frames of data, encoding selected portions of the third plurality of frames of data by an EFM encoder to generate a plurality of channel frames, and recording the channel frames on the optical medium.

In accordance with another aspect of the present invention, a method for receiving, decoding and presenting data is disclosed. In one embodiment, the method includes receiving a plurality of channel frames of data at an EFM decoder, decoding the channel frames using EFM decoding to generate F3 frames, locating Q sub-channel bits in respective control bytes of the F3 frames, selectively inverting the Q sub-channel bits to generate decoded Q sub-channel information, and decoding and presenting the F3 frames using the decoded Q sub-channel information.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1A:
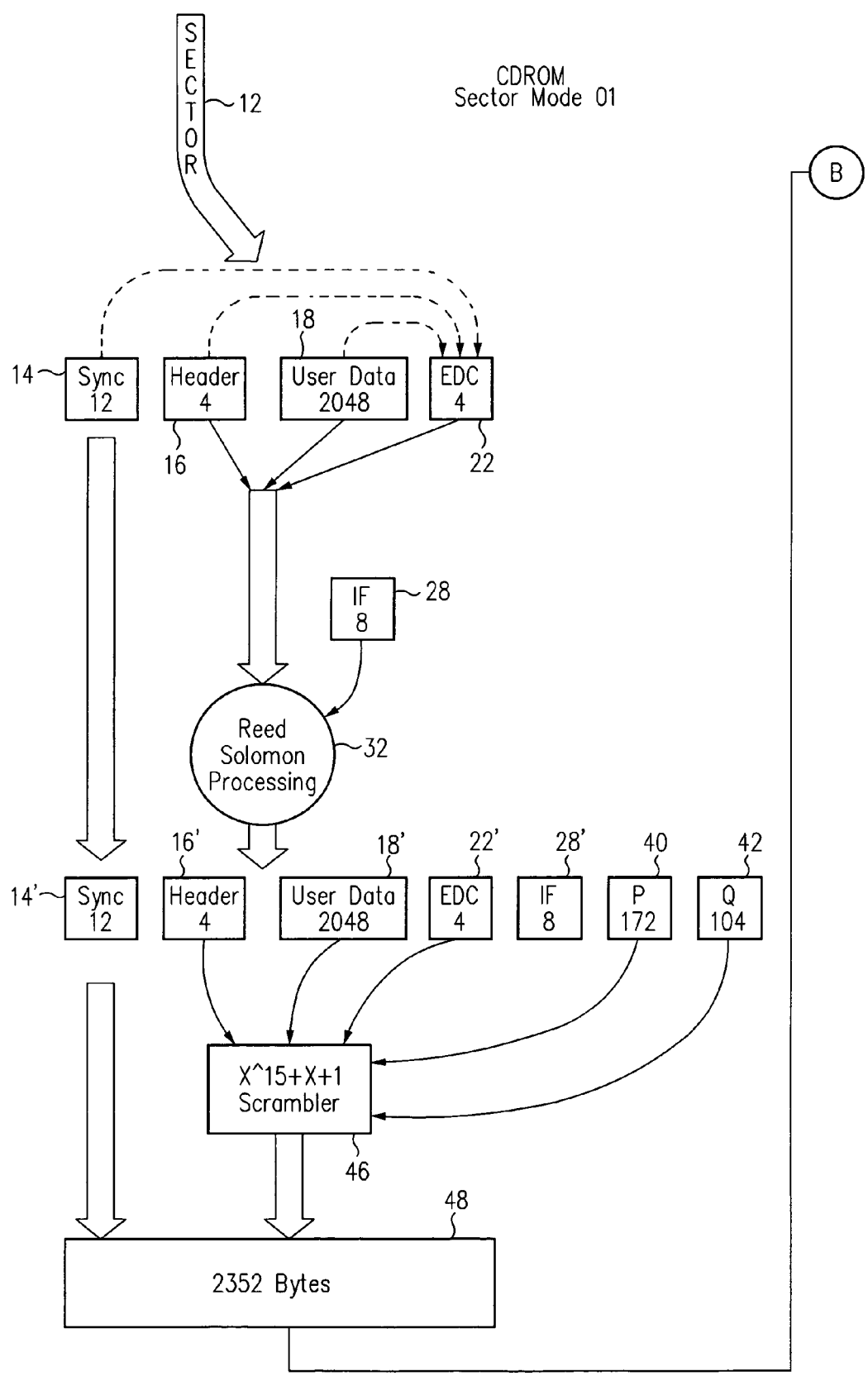
FIG. 1A shows a first portion of a process for creating a compliant CD in accordance with this invention.
Figure 1B:
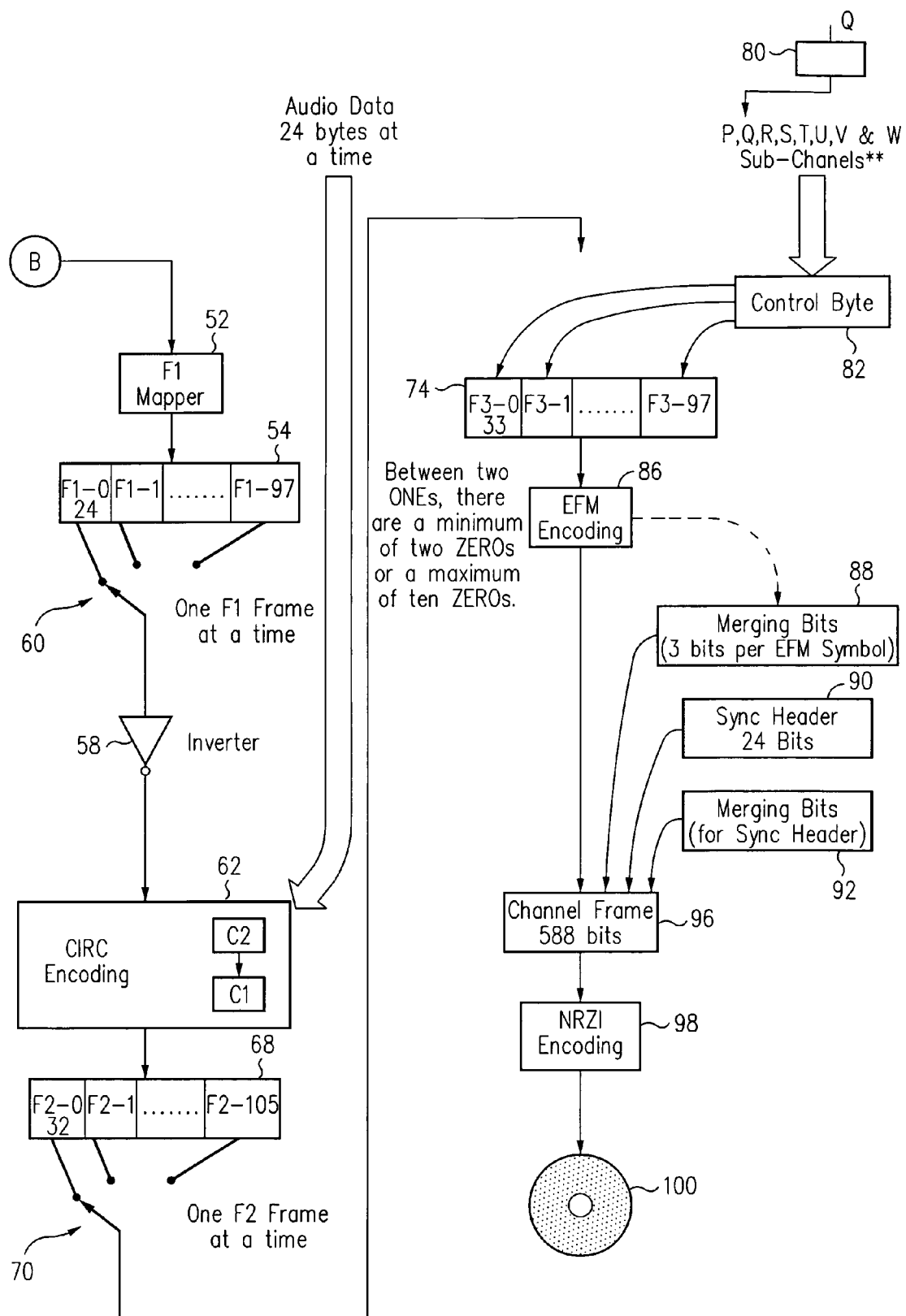
FIG. 1B shows a continuation of the process of FIG. 1A.

The preferred embodiments of the present invention and their advantages are best understood by referring to FIGS. 1A and 1B of the drawings. Like numerals are used for like and corresponding parts of the various drawings.

This invention is generally directed to compact disks and players. It is not limited to CDROMs (typically used for computer data), or video CDs. The embodiment described herein is for video CDs but is applicable to other types of CDs with suitable modifications, as apparent to one skilled in the art from this disclosure.

The process described herein is in the context of CDROMs and the terminology is in accordance with the ISO/IEC 10149, Second Edition (1995-07-15) specification for CDROMs, which is incorporated herein by reference in its entirety. With suitable modifications this is applicable to video CDs.

FIGS. 1A and 1B together show a process flow for creating a compliant CD in accordance with this invention. Most of FIGS. 1A and 1B is conventional, except for two data alterations. Hence while the following description is of the entire CD creation (writing) process, it is to be understood that most of this is conventional and disclosed here only for background purposes. The above specification gives further detail of the data structures on a typical CD. Again this is merely illustrative of one CD specification standard.

Beginning in the upper left hand portion of FIG. 1A there is the incoming "sector" data 12. The term "sector" refers to this being digital data already partitioned into sectors.

This incoming data 12 is in various fields. The associated overhead sync field 14, header field 16, and EDC (Error Detection Code) field 22 are created by the CDROM encoder. The incoming data is put in the user data field 18. The small numerals under each field name designate the field length in bytes. The user data is the largest field. The other fields are the overhead fields.

The sync field 14 is then passed directly to the next step 14'. This is combined with the IF (intermediate field) field 28. The resulting fields including the IF field 28' are shown below the Reed Solomon processing 32. The IF field is eight bytes of zero value. Added at this point, due to the Reed Solomon processing, is the Q field. The P and Q fields are the Forward Error Correction codes. At this point the header, user data, EDC, P and Q fields are subject to a scrambler 46 using the scrambling algorithm 46. This results in a 2,352 byte data structure 48.

Processing continues at B. (Reference character B merely shows the continuation of the process.) In FIG. 1B, next is the F1 mapper 52, which maps the 2,352 byte data structure 48 into 98 F1 frames designated 0 through 97. (These frames are not the same as ordinary video frames.) Each F1 frame 54 has a length of 24 bytes.

Up to this point, all processing is conventional. At this point, scrambling (inversion) in accordance with this invention is introduced by processing the F1 frame data 54 through inverter 58. (An alternative to this scrambling is encryption.) Inverter 58 accepts one F1 frame at a time, as shown by the switching process 60 which conventionally interleaves the frames. Each frame is subject to a simple bit-by-bit inversion of all its data including the sector address information. Thus each 1 bit is inverted to 0 and each 0 bit is inverted to 1.

Subsequent processing is conventional, including the Cross Interleaved Reed-Solomon Code (CIRC) encoding 62. The CIRC encoder as shown accepts data from the inverter or from an audio input.

The CIRC encoder 62 adds 8 bytes of data to each of the 98 F1 frames. This data is spread out over 106 F2 frames, each of 32 bytes. The F2 frame data which includes the CIRC information from the CIRC encoder 62 thus becomes 106 32-byte frames stored in register 68. This is read out by switching process 70 to become 98 33-byte F3 frames 74, which form a section. F3 frames are identical to F2 frames except for the added control byte 82.

The information for each frame in the P, Q, R, S, T, U, V and W sub-channels is added as shown to form the control byte 82 of 8 bits. Thus there is a single bit in byte 82 for each sub-channel P through W. These sub-channels are for control purposes. The typical use of the P sub-channel is for an audio player to indicate when the audio starts and stops. The Q sub-channel typically includes the table of contents of the program information in the lead-in area of the disk, and includes index and elapsed time information in the user data area of the disk, as specified in ISO/IEC 10149. The other sub-channels typically are not used.

In accordance with this invention, there is an additional scrambling step in which at least the sector address information in the Q sub-channel table of contents is scrambled or otherwise altered by a Q sub-channel encoder 80. Two examples of such alteration of the Q sub-channel are described herein. However, it will be understood that other methods of encoding the Q sub-channel may be used.

In the first example, the entire Q sub-channel, or selected portions thereof, are subject to an inversion. P, Q, R, S, T, U, V, W sub-channel processing is typically performed off-line and, in accordance with this invention, also involves subjecting, in the Q sub-channel, at least the sector address information to an inversion by Q sub-channel encoder 80. Thus at least the sector address information in the Q sub-channel is subject to this inversion, on a bit-by-bit basis. The resulting control byte 82 is then appended to each of the F3 frames.

In the second example of Q sub-channel encoding, a portion of the Q sub-channel is scrambled using an exclusive-OR function in Q sub-channel encoder 80. The Q sub-channel of a 98-frame section typically comprises 96 bits, since the first two control bytes of a section are occupied by the S0 and S1 bytes. The Q sub-channel of a section typically comprises a control field (four bits), a q-Mode field (four bits), a q-Data field (72 bits) and a cyclical redundancy check (CRC) field (16 bits). In accordance with the present invention, the first 80 bits of the Q sub-channel may be scrambled using the XOR function described below, while the last 16 bits which make up the CRC field are computed in the usual fashion.

The first 80 bits of the Q sub-channel may be treated as 10 eight-bit bytes. These 10 bytes may be XORed on a byte-by-byte basis with 10 eight-bit encoding bytes. The encoding bytes may be selected arbitrarily. An exemplary set of 10 encoding bytes is set forth in Table A.

TABLE A

| Byte | Value |
| --- | --- |
| 0 | 01110001 |
| 1 | 10001110 |
| 2 | 00110011 |
| 3 | 11001100 |
| 4 | 10101010 |
| 5 | 01010101 |
| 6 | 11110000 |
| 7 | 00001111 |
| 8 | 11111111 |
| 9 | 00000000 |

It will be understood that this second exemplary method of encoding the Q sub-channel simply provides selective inversion of Q sub-channel bits. Wherever a "one" occurs in an encoding byte, the corresponding bit of the Q sub-channel is inverted, while a "zero" in the encoding byte means that the corresponding bit of the Q sub-channel is left unchanged. This is in contrast to the first exemplary encoding method described above, in which all bits of at least a portion of the Q sub-channel are inverted.

This Q sub-channel scrambling, by itself novel and useful, may eliminate the need for the other inverter (inverter 58 in FIG. 1B). Scrambling the Q sub-channel address information may provide some protection, but scrambling most of the information provides more protection. As previously described, the format for the data stored in the Q sub-channel varies depending upon its location on the CD. The general format is data followed by the CRC. In accordance with this invention, the data portion is altered prior to the calculation of the CRC. There is one portion of this data which in some instances may not be altered.

The 98 F3 frames are eventually written to the CD as a series of channel frames, where the first channel frame has the control byte forced to be the conventional S0 sync symbol and the second channel frame has the control byte forced to be the conventional S1 sync symbol. S0 and S1 sync symbols have no relationship to the "Sync Header" block 90 in FIG. 1B. If one envisions how an optical pickup head would sense data on a CD, one imagines it as seeing a series of bits being picked up from the disk (i.e., in serial fashion), in order to reconstruct the 98 F3 frames. One needs some way of identifying frame F3-0 or F3-1. This is done by looking for either the S0 or S1 symbols. Therefore one cannot alter the S0 or S1 symbols in systems that use a standard IC (integrated circuit) that only detects the standard (i.e., non inverted) S0 or S1 symbol. Further, the CRC is not altered either because in systems that use a standard IC with CRC, the verification circuitry would (falsely) determine that the CRC is wrong.

In systems that use standard ICs one must be careful about which parts of the data are inverted so that the S0 and S1 symbols can be successfully detected (in those channel frames that have them) and that the CRC can be recovered correctly.

The following processing in FIG. 1B is conventional, and includes EFM encoding 86. This requires encoding such that between two 1's there a minimum of two 0's or a maximum of ten 0's. This EFM encoding is performed for signal processing purposes. At this point, additionally the merging bits 88 (three per EFM symbol), the sync header 90 and the merging bits (for the sync header) 92 are added, resulting in the channel frame 96. This is then subject to the non-return to zero inverted (NRZI) encoding 98. The NRZI encoded information is then written onto a master disk 100. This master disk is then used conventionally to produce "stampers" which press out the plastic disks which are commercially distributed.

Hence FIGS. 1A and 1B show the CD encoding (writing) process. For video CDs, a similar process is used except that there is no IF field, Reed Solomon processing, or P and Q fields.

The compliant player which is to read the resulting CDs, while largely conventional, includes two suitable logic functions respectively complementary to inverter 58 and Q sub-channel encoder 80. These two functional blocks in the player respectively (1) re-invert data in the data stream and (2) decode the Q sub-channel in accordance with the encoding method used. Hence the compliant player is conventional except for these two additional logic functions. The inverters need not be hardware devices but may be software functions, given adequate processing speed. The same of course is true for the inverter 58 and Q sub-channel encoder 80 in FIG. 1B; they may be hardware logic or software logic functions.

In another embodiment, there may is only one inversion process e.g., in the Q sub-channel or in the data stream rather than two as shown in FIG. 1B. However, it is preferred to have two inversions or alterations as shown in FIG. 1B. This ensures that standard players are unable to play a compliant CD-ROM. In the absence of one of the inversion processes, some conventional (non-compliant) players may be able to play such a compliant disk, which is considered undesirable.

Also, in another embodiment there is no inversion but instead the only change is in the sector address information in the Q sub-channel. In this embodiment, rather than being in the Q sub-channel, the sector address information is instead put in one of the unused sub-channels such as R, S, T, etc. In this case there is no inversion or scrambling. Again the compliant player must be complementary to read the sector address from the correct sub-channel in which this information is now located.

The simple inversion scrambling of FIG. 1B is of course not limiting. Other types of more sophisticated scrambling and/or encryption may be used. However even the simplest type of scrambling is effective in this context.

Figure 2:
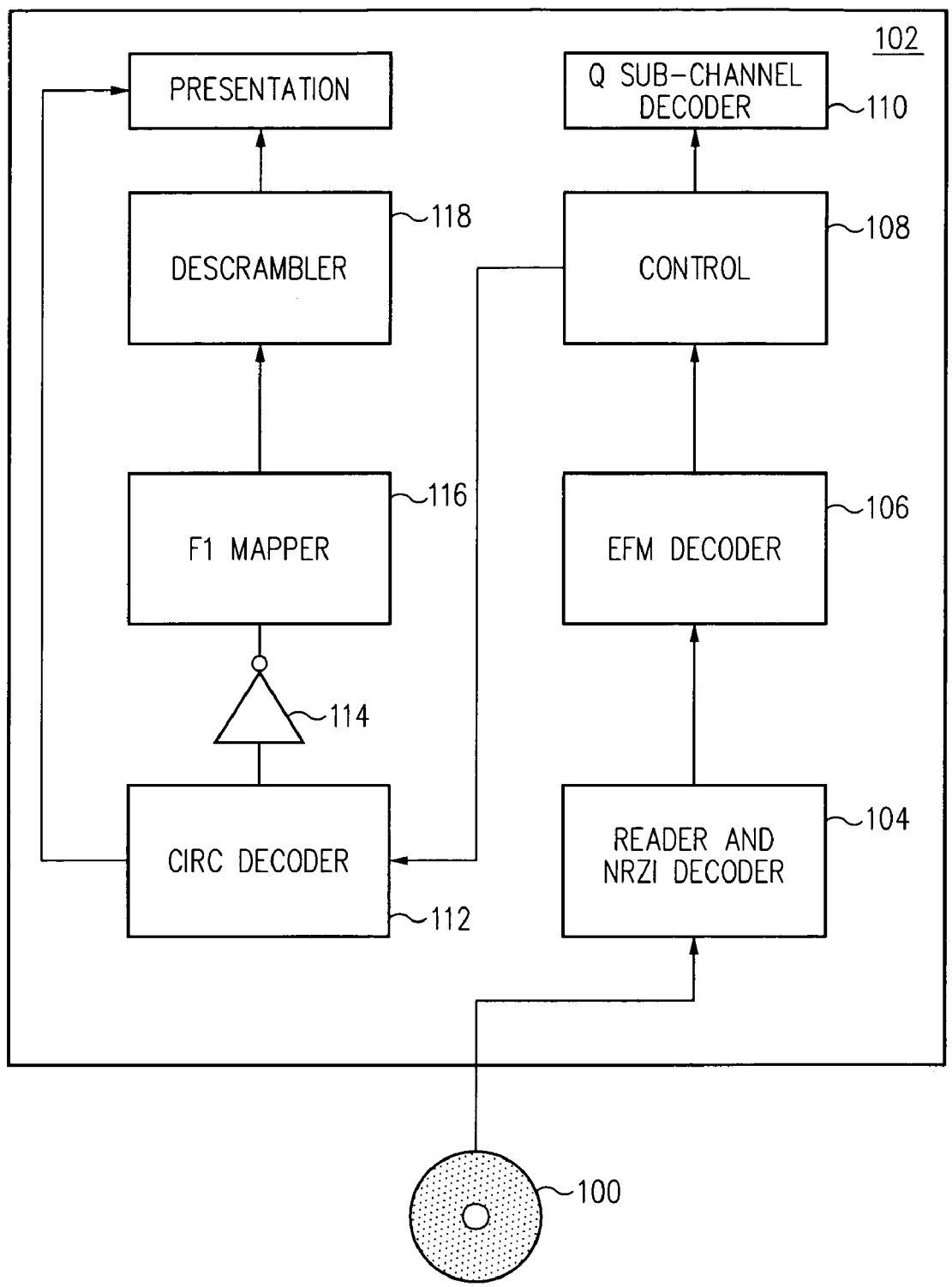
FIG. 2 is a simplified block diagram of an exemplary CD playback system designed to operate in accordance with the present invention.

Referring to FIG. 2, a simplified block diagram of an example of a CD playback system 102 is shown. Playback system 102 includes a CD reading and NRZI decoding system 104, which may include laser optical elements for reading information from CD 100 and a conventional NRZI decoder to extract data bits from the resulting signal. The data generated by CD reading and NRZI decoding system 104 includes data in the form of channel frames.

A conventional EFM decoding system 106 converts the fourteen-Channel bit bytes of the channel frames to eight-bit bytes, thereby generating a series of F3 frames. EFM decoding system 106 discards the merging bits and sync header information from the data stream.

A control block 108 extracts the control bytes from the F3 frames to generate F2 frames. The Q sub-channel data from the control bytes is provided to a Q sub-channel decoder 110, which performs a decoding function corresponding to the encoding function performed by Q sub-channel encoder 80 shown in FIG. 1B. For example, when Q sub-channel encoder 80 performs an XOR function using a set of encoding bytes as previously described, Q sub-channel decoder 110 may decode the Q sub-channel by performing an XOR function on the encoded Q sub-channel using the same set of encoding bytes, thereby restoring the original Q sub-channel information. The restored or decoded Q sub-channel may then be used by other parts of playback system 102 (not shown) in a conventional manner to assist in the decoding and presentation of the data from CD 100.

The F2 frames generated by control block 108 are provided to a CIRC decoder 112, which operates in a conventional manner to decode the F2 frames to generate either audio data or F1 frames. The resulting F1 frames may be inverted by an inverter 114 if an inverter 58 (shown in FIG. 1B) is used in the CD recording process.

An F1 mapper 116 receives the inverted F1 frames and uses a conventional mapping function to obtain scrambled sector data, which is then descrambled by descrambler 118 to restore the original sector data. This sector data is then provided to a presentation system 120, which may include digital to analog converters, speakers, a display screen, or other conventional equipment to present the sector data from CD 100 to a user. Audio data decoded by CIRC decoder 112 may be provided directly to presentation system 120 for presentation to the user.

By performing the inverse of the data encoding functions illustrated in FIGS. 1A and 1B, CD playback system 102 is able to play back a CD 100 recorded using the methods described above, which may not be played back by conventional CD playback systems.

It will be appreciated that the present method and apparatus are not limited to video; also computer data and audio program material on CDs may be protected as disclosed herein. In addition to the above-described scrambling, one may use encryption or other ways of altering, in a systematic or reversible way, the Q sub-channel information.

Although the present invention and its advantages have been described in detail, it should be understood that various changes, substitutions, and alterations can be made therein without departing from the spirit and scope of the invention as defined by the appended claims.

I claim:

1. A method for receiving, decoding and presenting data recorded on a compact disk according to a proprietary format wherein the proprietary format is a variant of a standard compact disk format, such that a compact disk player compliant with the proprietary format plays compact disks compliant with the proprietary format but does not play compact disks compliant with the standard formats and compact disks compliant with the proprietary format cannot be successfully copied by a compact disk player compliant with the standard or proprietary formats, and the compact disks compliant with the proprietary format cannot be played on a compact disk player compliant with the standard format, the method comprising:

receiving a plurality of channel frames of data from the compact disk at an EFM decoder;

decoding the channel frames using EFM decoding to generate F3 frames;

locating Q sub-channel bits in respective control bytes of the F3 frames;

selectively inverting the Q sub-channel bits to generate decoded Q sub-channel information that after the inverting does not conform to the proprietary format and does conform to the standard format; and decoding and presenting the F3 frames using the decoded Q sub-channel information.

2. The method of claim 1, wherein decoding and presenting the F3 frames comprises:

removing a control byte from each F3 frame to generate an F2 frame;

receiving the F2 frame at a Cross Interleave Reed-Solomon Code (CIRC) decoder; and decoding the F2 frame by the CIRC decoder.

3. The method of claim 2, wherein decoding and presenting the F3 frames further comprises:

descrambling the output of the CIRC decoder to generate a data stream; and presenting the data stream in a perceptible form to a user.

4. The method of claim 3, wherein decoding and presenting the F3 frames further comprises inverting the output of the CIRC decoder prior to descrambling the output of the CIRC decoder.

5. An optical disk playback system for playing back data recorded on an optical disk according to a proprietary format wherein the proprietary format is a variant of a standard optical disk format, such that an optical disk player compliant with the proprietary format plays optical disks compliant with the proprietary format but does not play optical disks compliant with the standard format, and optical disks compliant with the proprietary format cannot be successfully copied by an optical disk player compliant with the standard or proprietary formats, and the optical disks compliant with the proprietary format cannot be played on an optical disk player compliant with the standard format, and comprising:

a data reading system operable to read a plurality of channel frames recorded according to the proprietary format from an optical disk;

an EFM decoder operable to decode the channel frames to generate F3 frames;

a Q sub-channel decoder operable to locate Q sub-channel bits in respective control bytes of the F3 frames and to selectively invert the Q sub-channel bits to generate decoded Q sub-channel information that does not conform to the proprietary format and does conform to the standard format; and a signal decoding and presentation system operable to receive the F3 frames, and operable to decode the F3 frames to generate a data stream using the decoded Q sub-channel information, and operable to present the data stream in a perceptible form to a user.

6. The optical disk playback system of claim 5, wherein the signal decoding and presentation system comprises:

a control block operable to remove a control byte from each F3 frame to generate an F2 frame;

a Cross Interleave Reed-Solomon Code (CIRC) decoder operable to receive and decode the F2 frame.

7. The optical disk playback system of claim 6, wherein the signal decoding and presentation system further comprises:

a descrambling system operable to descramble the output of the CIRC decoder to generate a data stream.

8. The optical disk playback system of claim 7, wherein the signal decoding and presentation system further comprises an inverter operable to invert the output of the CIRC decoder prior to the descrambling of the output of the CIRC decoder by the descrambling system.

9. A method for recording data on an optical medium according to a proprietary format wherein the proprietary format is a variant of a standard optical medium format, such that an optical medium player compliant with the proprietary format plays optical media compliant with the proprietary format but does not play optical media compliant with the standard format, and optical media compliant with the proprietary format cannot be successfully copied by an optical medium player compliant with the standard or proprietary formats, and the optical media compliant with the proprietary format cannot be played on a optical medium player compliant with the standard format, the method comprising:

receiving a first plurality of frames of data at a Cross Interleave Reed-Solomon Code (CIRC) encoder;

encoding the first plurality of frames of data by the CIRC encoder to generate a second plurality of frames of data;

generating a set of data to form a Q sub-channel;

altering selected data bits in the Q sub-channel to form an encoded Q sub-channel wherein only after the altering the encoded Q sub-channel conforms to the proprietary format and does not conform to the standard format;

forming a plurality of control bytes including the encoded Q sub-channel;

adding one of the control bytes to each one of the second plurality of frames of data to generate a third plurality of frames of data;

encoding selected portions of the third plurality of frames of data by an EFM encoder to generate a plurality of channel frames; and recording the channel frames on the optical medium.

10. The method of claim 9, wherein altering the selected data bits in the Q sub-channel to form the encoded Q sub-channel comprises:

reading a plurality of stored encoding bits; and performing an exclusive-OR operation between the selected data bits in the Q-sub-channel and corresponding ones of the encoding bits.

11. The method of claim 10, further comprising:
scrambling a sector of data to generate a scrambled sector; and
rearranging the scrambled sector to generate the first plurality of frames of data.

12. The method of claim 11, further comprising inverting the first plurality of frames of data prior to receiving the first plurality of frames of data at the CIRC encoder.

13. The method of claim 9, wherein altering the selected data bits in the Q sub-channel to form the encoded Q sub-channel comprises relocating the selected data bits in the Q sub-channel to respective alternative sub-channel locations of the control bytes.

14. An optical disk playback system for playing back data recorded on an optical disk according to a proprietary format wherein the proprietary format is a variant of a standard compact disk format, such that a compact disk player compliant with the proprietary format plays compact disks compliant with the proprietary format but does not play compact disks compliant with the standard format, and compact disks compliant with the proprietary format cannot be successfully copied by a compact disk player compliant with the standard or proprietary formats, and the compact disks compliant with the proprietary format cannot be played on a compact disk player compliant with the standard format, and comprising:
a data reading system operable to read a plurality of channel frames recorded according to the proprietary format from an optical disk;
an EFM decoder operable to decode the channel frames to generate F3 frames;
a Q sub-channel decoder operable to locate Q sub-channel bits in alternative sub-channel locations in control bytes of the F3 frames to generate Q sub-channel information that does not conform to the proprietary format and does conform to the standard format; and
a signal decoding and presentation system operable to receive the F3 frames, and operable to decode the F3 frames to generate a data stream using the Q sub-channel information, and operable to present the data stream in a perceptible form to a user.

15. A method for recording data on an optical medium according to a proprietary format wherein the proprietary format is a variant of a standard optical medium format, such that an optical medium player compliant with the proprietary format plays optical media compliant with the proprietary format but does not play optical media compliant with the standard format, and optical media compliant with the proprietary format cannot be successfully copied by an optical medium player compliant with the standard or proprietary formats, and the optical media compliant with the proprietary format cannot be played on an optical medium player compliant with the standard format, the method comprising:
receiving the data at an encoding system;
assigning the data to a plurality of data sets by the encoding system;
generating address information for each data set;
encoding the address information for each data set according to the proprietary format without otherwise altering the data set from the standard format;
joining each data set with its respective encoded address information to form an addressed data set;
recording the addressed data sets on the optical medium.

16. The method of claim 15, further comprising encoding each addressed data set prior to recording the addressed data set on the optical medium.

17. The method of claim 16, wherein encoding each addressed data set comprises performing EFM encoding on the data set.

18. The method of claim 17, wherein encoding each addressed data set further comprises performing NRZI encoding on the data set.

19. The method of claim 15, wherein the address information comprises a Q sub-channel.

20. A method for receiving, decoding and presenting data recorded on a compact disk according to a proprietary format wherein the proprietary format is a variant of a standard compact disk format, such that a compact disk player compliant with the proprietary format plays compact disks compliant with the proprietary format but does not play compact disks compliant with the standard format, and compact disks compliant with the proprietary format cannot be successfully copied by a compact disk player compliant with the standard or proprietary formats, and the compact disks compliant with the proprietary format cannot be played on a compact disk player compliant with the standard format, the method comprising:
receiving a plurality of channel frames of data;
decoding the channel frames using eight to fourteen modulation (EFM) to generate F3 frames;
locating Q sub-channel bits in respective control bytes of the F3 frames;
altering at least some of the Q sub-channel bits to generate decoded sub-channel information that after the altering does not conform to the proprietary format and does conform to the standard format; and
decoding and presenting the F3 frames using the decoded sub-channel information.

21. The method of claim 20, wherein altering the Q sub-channel bits comprises selectively inverting the Q sub-channel bits.

22. The method of claim 20, wherein altering the Q sub-channel bits comprises inverting all of the Q sub-channel bits.

23. The method of claim 20, wherein altering the Q sub-channel bits comprises locating sector address information in other than the Q sub-channel.

24. The method of claim 20, further comprising inverting bits in the generated frames.

25. An optical disk playback system for playing back material recorded on an optical disk according to a proprietary format wherein the proprietary format is a variant of a standard compact disk format, such that a compact disk player compliant with the proprietary format plays compact disks compliant with the proprietary format but does not play compact disks compliant with the standard formats and compact disks compliant with the proprietary format cannot be successfully copied by a compact disk player compliant with the standard or proprietary formats, and the compact disks compliant with the proprietary format cannot be played on a compact disk player compliant with the standard format, and comprising:
a data reading system operable to read a plurality of channel frames recorded according to the proprietary format from an optical disk;
an eight to fourteen modulation (EFM) decoder coupled to the data reading system thereby to decode the channel frames to generate F3 frames;
a Q sub-channel decoder coupled to locate Q sub-channel bits in respective control bytes of the F3 frames and to alter at least some of the Q sub-channel bits to generate decoded sub-channel information that does not conform to the proprietary format and does conform to the standard format; and a signal decoding and presentation system coupled to the Q sub-channel decoder thereby to receive the F3 frames, and to decode the F3 frames to generate a data stream using the decoded sub-channel information, and operable to present the data stream in a perceptible form to a user.

26. The optical disk playback system of claim 25, wherein altering the Q sub-channel bits comprises selectively inverting the Q sub-channel bits.

27. The optical disk playback system of claim 25, wherein altering the Q sub-channel bits comprises inverting all of the Q sub-channel bits.

28. The optical playback system of claim 25, wherein altering the Q sub-channel bits comprises locating sector address information in other than the Q sub-channel.

29. The optical playback system of claim 25, wherein the signal decoding and presentation system is also operable to invert bits in the decoded frames.

30. A method for recording data on an optical medium according to a proprietary format wherein the proprietary format is a variant of a standard optical medium format, such that an optical medium player compliant with the proprietary format plays optical media compliant with the proprietary format but does not play optical media compliant with the standard format, and optical media compliant with the proprietary format cannot be successfully copied by an optical medium player compliant with the standard or proprietary formats, and the optical media compliant with the proprietary format cannot be played on an optical medium player compliant with the standard format, the method comprising:

receiving a first plurality of frames of data;

encoding the first plurality of frames of data by Cross Interleave Reed-Solomon Code to generate a second plurality of frames of data;

generating a set of data to form a Q sub-channel;

altering at least some bits in the Q sub-channel to form an encoded sub-channel wherein only after the altering the encoded sub-channel conforms to the proprietary format and does not conform to the standard format;

forming a plurality of control bytes including the encoded sub-channel;

adding one of the control bytes to each one of the second plurality of frames of data to generate a third plurality of frames of data;

encoding selected portions of the third plurality of frames of data by eight to fourteen modulation (EFM) to generate a plurality of channel frames; and recording the channel frames on the optical medium.

31. The method of claim 30, wherein the altering comprises selectively inverting the Q sub-channel bits.

32. The method of claim 30, wherein the altering comprises inverting all of the Q sub-channel bits.

33. The method of claim 30, wherein the altering comprises finding sector address information in the Q sub-channel and relocating the sector address information in other than the Q sub-channel.

34. The method of claim 30, further comprising inverting bits in the frames of data.

35. An optical medium recorded according to the method of claim 30.

* * * * *